May 29, 1956 J. O. HELVERN 2,747,694
BRAKE WEAR COMPENSATOR
Filed April 5, 1951 2 Sheets-Sheet 1
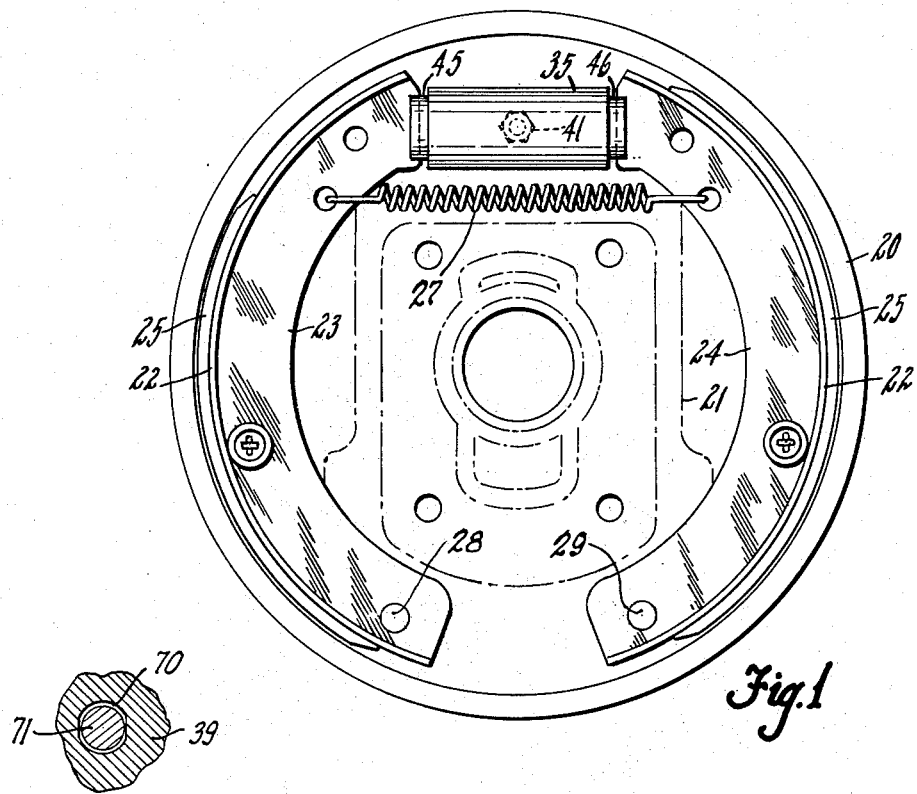
Fig.1
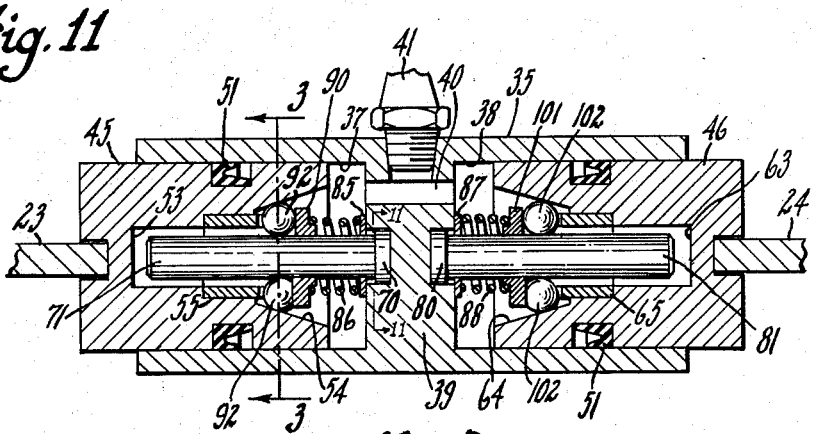
Fig.2
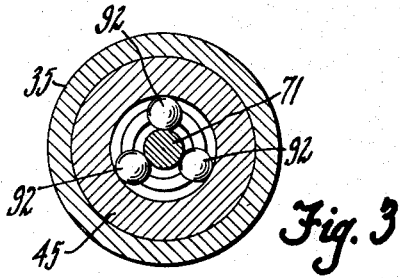
Fig.3
Fig.11
INVENTOR.
JAMES O. HELVERN
BY
HIS ATTORNEYS May 29, 1956     J. O. HELVERN     2,747,694
BRAKE WEAR COMPENSATOR
Filed April 5, 1951     2 Sheets-Sheet 2

INVENTOR.
JAMES O. HELVERN
BY
HIS ATTORNEYS

United States Patent Office 2,747,694
Patented May 29, 1956

2,747,694

BRAKE WEAR COMPENSATOR

James O. Helvern, Lewisburg, Ohio, assignor to General Motors Corporation, Detroit, Mich., a corporation of Delaware Application April 5, 1951, Serial No. 219,352

6 Claims. (Cl. 188—79.5)

This invention relates to improvements in hydraulically actuated brakes.

It is among the objects of the present invention to provide an hydraulically actuated brake with means operative automatically to compensate for wear of the frictional material with which the brake shoes are lined.

A further object of the present invention is to provide an hydraulically actuated brake with a wear compensating device which, when the brake is disassembled for purposes of relining the brake shoes, may be readjusted to the thickness of the new lining without requiring disassembly of the wheel cylinder in which the compensating device is located.

A still further object of the present invention is to provide a brake shoe wear compensating device which continually and automatically makes adjustments for the wearing brake instead of periodical adjustments in response to fixed degrees of brake shoe wear as provided for in many known wear compensating devices.

Further objects and advantages of the present invention will be apparent from the following description, reference being had to the accompanying drawings wherein a preferred embodiment of the present invention is clearly shown.

In the drawings:

Fig. 1 is a front view of a hydraulically actuated brake.

Fig. 2 is a sectional view of the brake actuating mechanism equipped with the present invention.

Fig. 3 is a detail sectional view taken along the line and in the direction of the arrows 3—3 of Fig. 2.

Fig. 11 is a cross sectional view taken on line 11—11 of Fig. 2.

Figure 4:
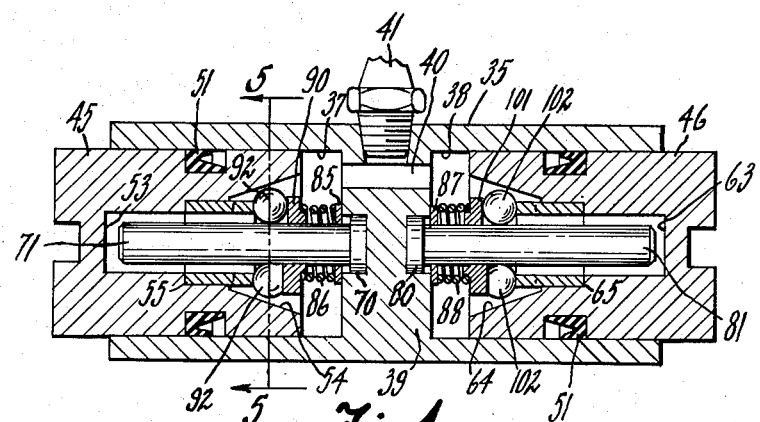
Fig. 4 is a view similar to Fig. 3 with the clutch shown in disengaging position, however.
Figure 5:
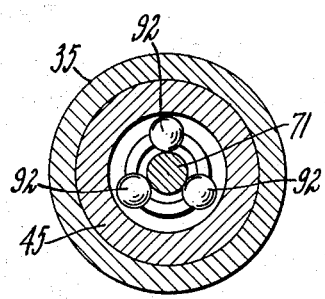
Fig. 5 is a detail sectional view taken along the line and in the direction of the arrows 5—5 in Fig. 4.
Figure 6:
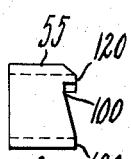
Fig. 6 is a detail side view of the clutch release collar.
Figure 7:
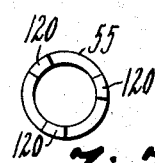
Fig. 7 is a front view of the collar shown in Fig. 6.

The present invention is shown applied to an automotive brake in which a drum 20 is operated by the moving vehicle. The brake mechanism is supported upon a stationary backing plate 21 shown in dot and dash lines. Two oppositely disposed brake shoes 23 and 24 are loosely secured to the backing plate 22 in any suitable manner. Each brake shoe is provided with brake lining 25 adapted frictionally to engage the drum 20 when the brake shoes are urged outwardly. Adjacent ends of the brake shoes 23 and 24 are yieldably urged against respective pistons 45 and 46 by a retractor spring 27 secured between said shoes 23 and 24. The other two adjacent ends of brake shoes 23 and 24 are hingedly attached to the pivot pins 28 and 29 carried by the backing plate 21.

The means for urging the brake shoes 23 and 24 into frictional engagement with the rotating drum 20 comprises a hydraulically actuated mechanism consisting of a cylinder block 35 attached to the backing plate 22. This cylinder block 35 as shown in Figs. 2 and 4 has recessed ends providing cylinders 37 and 38 separated by the intermediate partition 39 within the cylinder block. A duct 40 in the partition 39 provides communication between both cylinders 37 and 38, said ducts also communicating with a threaded opening in the cylinder block 35 for receiving a nipple 41 to which the conduit leading from the source of fluid pressure is connected.

Within each cylinder a movable piston is provided, the piston in cylinder 37 being designated by the numeral 45, the piston in cylinder 38 by the numeral 46. The outer end of piston 45 is transversely slotted to receive the brake shoe 23 whereby piston 45 is mechanically connected with brake shoe 23, the shoe preventing rotation of the piston 45 within its cylinder 37. The outer end of piston 46 has a similar transverse slot to receive the brake shoe 24. Any suitable sealing means 51 is provided on both pistons 45 and 46 for substantially reducing the possibility of any fluid leakage past the piston. Piston 45 has a central recess 53 provided in its inner surface, the outer entrance end of said recess 53 being tapered as at 54. A cam controlling collar 55 is pressed into a counterbored portion of the recess 53 adjacent the tapered portion 54 of said recess. Likewise piston 46 has a central recess 63, the entrance end of said recess 63 being tapered as at 64. A counterbore in the recess receives the clutch adjusting collar 65 so that a portion of this collar extends into the portion of the recess defined by the tapered wall 64 thereof. The opposite walls of the partition 39, or more particularly the bottom ends of cylinders 37 and 38, are recessed. The recess in the bottom wall of the cylinder 37 receives the head 70 of the detention pin 71 which is cylindrically shaped, the head 70 having one or more flat sides fitting into the recess in the partition 39 at the bottom of the cylinder 37 so as to prevent rotation of the detention pin 71 relatively to the cylinder block 35. In a like manner the detention pin 81 extending coaxially into the cylinder 38 has its head portion 80 nested within the recess provided in the partition 39 and bottom surface of the cylinder 38. A collar 85 slidably fitting over the detention pin 71 is yieldably urged against the partition 39, or the bottom surface of cylinder 38, by spring 86 and likewise collar 87 fitting loosely about the detention pin 81 is yieldably urged against the partition 39, or the bottom wall of cylinder 38, by the spring 88. The heads 70 and 80 of the detention pins 71 and 81 respectively are of lesser thickness than the depth of the recesses in which said heads are nested and therefore said detention pins 71 and 81 may be reciprocated longitudinally, said reciprocation being limited by the respective collars 85 and 87 and the bottom of the recesses in which said head portions 70 and 80 are nested. This limited reciprocative movement of the detention pins 71 and 81 is predetermined, being substantially equal to the necessary movement of the brake shoes 23 and 24 outwardly from normal position into the proper frictional engagement with the rotating drum 20.

Figures 9, 10:
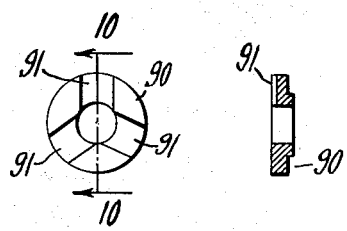
Fig. 9 is a front view of the ball spacing disc.
Fig. 10 is a transverse section of the disc, taken along the line and in the direction of the arrows 10—10 of Fig. 9.
Figure 8:
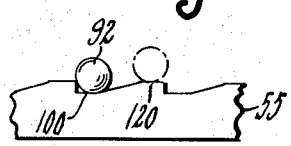
Fig. 8 is an enlarged development of a portion of the annular edge of the collar shown in Fig. 7.

Spring 86 surrounding the detention pin 71 and maintaining collar 85 upon the bottom wall of the cylinder 37, abuts against a spacer collar 90 slidably fitting about the detention pin 71. This spacer collar 90, illustrated detailedly in Figs. 9 and 10, has radial grooves 91 extending from its central opening to its outer peripheral edge, said radial grooves forming spacing retainers for the balls 92 which form the clutch for piston 45. Spring 86 urges the spacer collar 90 against the balls 92 thereby urging said balls into gripping engagement with the tapered annular wall 54 of recess 53 in piston 45 and also into gripping engagement with the outer annular surface of the detention pin 71. Normally said balls occupy the lower recessed area 100 of notches provided in the end edge of the clutch controlling collar or sleeve 55 pressed into a counterbored portion of the recess 53 in piston 45. Similarly spring 88 in cylinder 38 urges the limiting collar 87 about detention pin 81 against the partition 39 or bottom wall of cylinder 38 and also urges the radially grooved ball spacing collar 101 into engagement with balls 102 so that said balls grippingly engage the detention pin 81 as well as the tapered wall surface of the recess 64 in piston 46. Like the balls in piston 45 balls 102 normally are seated in the lowermost area 100 of notches provided in the outer edge of the clutch controlling or adjusting collar 65 pressed into the piston 46.

In order to urge the linings 25 of brake shoes 23 and 24 into frictional engagement with the rotating drum 20 hydraulic pressure medium is directed through the nipple 41 and duct 40 into the cylinders 37 and 38 moving the pistons 45 and 46 in said respective cylinders outwardly so that the brake shoes 23 and 24 are moved frictionally to engage the drum. When the piston 45 is moved outwardly as regards Fig. 2 the movement of the tapering surface 54 engaged by the clutch balls 92 is away from said balls and therefore the balls 92 will be urged to follow this movement of the piston 45 outwardly under the effect of the spring 86 urging the ball engaging collar 90 in the same direction. The balls 92 being held in engagement with both the tapering surface 54 of piston recess 53 and the detention pin 71, will cause the pin 71 to move with the piston 45. When the brake shoes 23 and 24 are in proper condition and properly adjusted it is necessary to move them outwardly a predetermined distance in order to have them frictionally engage the rotating drum. This predetermined distance, as has been stated, is substantially equal to the distance through which the detention pin 71 may move longitudinally and therefore when the piston 45 has been moved outwardly so that shoe 23 frictionally engages the rotating drum 20, the head of pin 70 will substantially be in engagement with the limiting collar 85 on the partition 39. When the hydraulic pressure is removed from piston 45, the retractor spring 27 connected with the brake shoe 23 will return the shoe and the piston 45 connected thereto to the normal position, this return of the piston 45 positively moving the detention pin 71 with it so that again the head 70 of said detention pin 71 will be brought into engagement with the bottom surface of the recess occupied by said head portion 70. The same is true of piston 46 which, when hydraulically actuated, will move shoe 24 into frictional engagement with the drum 20. As piston 46 moves outwardly spring 88 will cause balls 102 to follow movement of piston 46 outwardly, these balls gripping the detention pin 81 and moving it with the piston 46 so that its head portion 80 is moved from engagement with the bottom of the recess occupied by it into substantial engagement with the limiting or retainer collar 87 about detention pin 81. Return of the piston 46 by the return of shoe 24 under the influence of the retractor spring 27 will positively move the detention pin 81 through clutch ball 102 so that the head 80 thereof is brought back to normal position as shown in Fig. 2.

Any wearing down of the brake lining 25 on the shoes 23 and 24 will normally result in the shoes being moved through a greater than said predetermined distance in order to obtain frictional engagement of the shoes with the drum 20. Thus, if for instance, the lining on shoe 23 wears sufficiently hydraulic pressure moves piston 45 outwardly resulting in the normal follow up of the detention pin 71 until its head 70 engages the washer or collar 85 at which time the detention pin 71 is stopped from further movement with the piston 45. If at the time the head 70 of the detention pin 71 engages collar or washer 85 the piston 45 will not have moved the shoe 23 sufficiently to cause the lining on said shoe frictionally to engage the drum 20, the continuing hydraulic pressure upon piston 45 will move it until the friction material on shoe 23 does frictionally engage the drum 20. Thus, piston 45 moves outwardly relatively to the pin 71 whose outward movement is now prevented and therefore the balls 92 of the clutch, being urged to follow the piston 45 by spring 86 acting through spacer collar 90, will roll said balls 92 longitudinally along the immovable detention pin 71 until movement of the piston 45 outwardly under hydraulic pressure is discontinued due to the engagement of the brake shoe with the drum. Now when the hydraulic pressure is removed and retractor spring 27 becomes effective to return shoe 23 and its connected piston 45 to normal retracted position, pin 71 will be moved with piston 45 until its head portion 70 again strikes the bottom surface in the recess in which said piston head is nested. When the head 70 engages said bottom wall of the recess further movement of the piston 45 inwardly under the effect of retractor spring 27 will be prevented, for the balls 92 of the clutch now grippingly engage both the tapered surface 54 of piston 45 and the peripheral surface of detention pin 71, preventing any relative movement between the said piston and pin. The normal retracted position of piston 45 is now readjusted so that the brake shoe 23, or more particularly its brake lining 25, is again spaced the predetermined distance from the drum 20 thereby requiring only the normal, predetermined travel of the shoe to apply braking effort. This adjustment by the compensating device may occur in response to the minutest wear of the brake lining 25 on shoe 23 and therefore differs entirely from known wear compensating devices which make adjustments periodically and only in response to and after predetermined wear of a brake shoe lining.

The clutch mechanism including balls 102 in connection with piston 46 operates in the same manner. As long as proper clearances between the lining 25 on shoe 24 and the rotating drum obtain, piston 46 with its detention pin 81 will move so that the head 80 of said detention pin will shift from engagement with the bottom surface of the recess occupied by said head portion into substantial engagement with the washer or collar 87. Any wear of the lining 25 on shoe 24 will cause the piston 46 to move relatively to the detention pin 81 after the head 80 thereof engages the collar 87 whereby compensation for this wear is obtained, for the piston 46 will have assumed a new position relatively to the detention pin 81 said position being maintained upon the return of the piston 46 by the retractor spring 27 inasmuch as the clutch mechanism including balls 102 prevents relative movement between piston 46 and the detention pin 81 upon this return movement which is limited by the striking of the head 80 of the detention pin 81 with the bottom wall of the recess occupied by it.

These automatic adjustments continually made are effective during the wearing down of the lining 25 on the brake shoes 23 and 24. When these brake shoes are worn down sufficiently to warrant servicing of the brake by the removal of the old brake lining and replacement thereof by new, the compensating device must be readjusted to normal position so as to compensate for the added thickness of the normal brake lining over the worn brake lining. After the shoes 23 and 24 have been removed from the brake for relining purposes the pistons 45 and 46 are exposed and available for adjustment purposes. In the present construction it is not necessary to disassemble the hydraulic mechanism to make this adjustment. Normally pistons 45 and 46 can not be moved inwardly of their respective cylinders due to the fact that the clutch mechanism including balls 92 and 102 respectively securely fasten the respective pistons 45 and 46 to their detention pins 71 and 81, inward movements of which are prevented by their engagement with the recess end surfaces in the partitions 39. In order to move pistons 45 and 46 inwardly relatively to their respective detention pins, it is only necessary to rotate the pistons which causes the balls of the clutches in said pistons to move from the normal seating positions in the bottom area 100 of the notches provided in collars 55 and 65, to the upper surface areas 120 which, as shown in Fig. 4, moves the balls along their respective detention pins out of engagement with the tapered walls of the recesses in the respective pistons. Thus with the balls 92 out of engagement with the tapered wall portion 54 of the recess 53 in piston 45, said piston 45 may now be moved inwardly relatively to pin 71 into its normal position which it occupies when the brake shoe linings 25 were of normal thickness. Similarly rotation of piston 46 moves the clutch adjusting collar 65 so that balls 102 of this clutch roll from the lowermost and normally occupied area 100 on said collar 65 to the higher end surface 120 on said collar edge whereby the balls 102 are moved along the dentention pin 81 and out of engagement with the tapered wall surface 64 of the recess 63 in piston 46 thus permitting piston 46 to be moved inwardly relatively to its detention pin 81 into the normal position occupied by it when the lining 25 of the brake shoe 24 was of normal thickness. As soon as both pistons have been moved back to their normal position they are rotated in the opposite direction to return the respective balls of the clutches in said piston into the lower seating areas 100 of the respective collars 55 and 65 in which position the balls of the clutches are again rendered effective to prevent relative movement between the pistons 45 and 46 with their respective detention pins 71 and 81 under the influence of the retractor spring 27.

From the aforegoing it may be seen that the present invention provides a sturdy and dependable brake lining wear compensating device which is not operative periodically and only in response to a predetermined wear of the brake lining as in well known devices but on the contrary continually adjusts for any minute wear of the brake lining, said adjustments being continued throughout the life of the brake linings.

The device of the present invention also provides for simple adjustment to initial normal position without requiring any disassembly of the hydraulic brake actuating mechanism. Removal of the brake shoes for relining purposes renders the hydraulic brake actuating mechanism available to mere turning of the pistons at this time making it possible to readjust the wear compensating mechanism for use in connection with the new and normally thick brake lining on the shoes.

While the embodiment of the present invention as herein disclosed, constitutes a preferred form, it is to be understood that other forms might be adopted.

What is claimed is as follows:

1. In a brake having a rotatable drum in which two oppositely disposed brake shoes are normally held out of drum engagement and against abutment members by retractor spring means, the combination with a cylinder having oppositely disposed reciprocative pistons each engaging a respective brake shoe, said pistons being operative by fluid pressure introduced into the cylinder, to move the shoes into frictional engagement with the drum, of detention means supported in the cylinder so as to be longitudinally reciprocative with the pistons for a predetermined limited range of movement in either direction, said detention means extending into a recess in the respective pistons, the entrance ends of said recesses being tapered; and a ball clutch interposed between each piston and the detention means extending thereinto, said ball clutches releasing the pistons from their respective detention means when the pistons are pressure actuated beyond the range of movements of their respective detention means, the ball clutches being operative also immovably to secure the pistons to their respective detention means and thereby limit return movement of said pistons by the retractor spring means to the predetermined range of movement of said detention means.

2. A device in accordance with claim 1, in which the ball clutch consists of a plurality of balls located in the wedge-shaped spaces provided by the detention means and the surrounding tapered portion of the piston recesses, the balls being held spaced in a circular row by recessed collars on the detention means, said collars being yieldably urged to engage and yieldably hold the balls in engagement with adjacent surfaces of the detention means and tapered piston recesses whereby relative movement between the detention means and pistons is provided for as the pistons are pressure actuated to move the shoes into drum engagement and completely prevented as the pistons are actuated by the retractor spring means moving the shoes out of drum engagement.

3. In a brake having a rotatable drum in which two oppositely disposed brake shoes are normally held out of drum engagement and against abutment members by retractor spring means, the combination with an hydraulically operated brake shoe actuator consisting of a block providing two coaxial cylinders separated by an intermediate wall in which a duct, connected to the source of fluid pressure, interconnects said cylinders; a piston in each cylinder, each piston engaging a respective brake shoe and having a central recess, the entrance end thereof, adjacent the wall between the cylinders, being tapered; of detention rods supported in the said intermediate wall so as to be capable of reciprocative longitudinal movement of predetermined range in the respective cylinders, said rods extending into the recesses of the respective pistons and cooperating with the tapered ends of said recesses to form annular wedge-shaped spaces; a one-way clutch mechanism interposed between each piston and the detention rod extending thereinto, said clutch mechanism consisting of balls occupying the wedge-shaped space at the inner end of each piston and yieldably urged to engage both the detention rod and the surrounding tapering piston recess surface, said clutches permitting the pistons to move relatively to the respective detention rods when said pistons are actuated hydraulically beyond the predetermined range of detention rod movement and immovably securing the pistons to the respective rods to confine the piston return movement by the retractor spring means to the predetermined, limited range of detention rod movement.

4. A device in accordance with claim 3, in which, however, the hydraulically operative piston is provided with means in the form of a camming collar engaged by the clutch balls and operative to render the clutch ineffective in response to rotation of said piston relatively to said detention means whereby said piston may be manually adjusted relatively to said detention means.

5. In a brake having a rotatable drum in which two oppositely disposed brake shoes are normally held out of drum engagement and against abutment members by retractor spring means, the combination with an hydraulically operated brake shoe actuator consisting of a block providing two coaxial cylinders separated by an intermediate wall in which a duct, connected to the source of fluid pressure, interconnects said cylinders; a piston in each cylinder, each piston engaging a respective brake shoe and having a central recess, the entrance end thereof, adjacent the wall between the cylinders, being tapered; of detention rods supported in the said intermediate wall so as to be capable of reciprocative longitudinal movement of predetermined range in the respective cylinders, said rods extending into the recesses of the respective pistons; a one-way clutch mechanism interposed between each piston and the detention rod extending thereinto, said clutch mechanism being operative to permit creeping of the pistons relatively to the respective rods when the hydraulic pressure actuates said pistons beyond the predetermined limited range of rod movement to urge the shoes against the drum and to prevent creeping of the pistons relatively to the rods when said retractor spring means return the shoes to normal drum disengaging position.

6. A device in accordance with claim 5, in which each piston is provided with a camming collar having recessed areas engaged by the balls during brake usage whereby said clutch is effective; and having elevated areas operative, in response to rotation of the piston in the cylinders, for moving and holding the balls out of piston engagement whereby said piston may freely be adjusted in either direction relatively to the detention rods.

References Cited in the file of this patent

UNITED STATES PATENTS

| | | |
|---|---|---|
| 1,668,730 | Pearson | May 8, 1928 |
| 1,755,829 | Loughead | Apr. 22, 1930 |
| 1,808,079 | Seddon et al. | June 2, 1931 |
| 2,100,488 | Rasmussen | Nov. 30, 1937 |
| 2,138,206 | Rasmussen et al. | Nov. 29, 1938 |
| 2,234,689 | Chard | Mar. 11, 1941 |
| 2,474,990 | Slatin | July 5, 1949 |

FOREIGN PATENTS

| | | |
|---|---|---|
| 806,896 | France | Oct. 5, 1936 |